(12) United States Patent
Tilly et al.

(10) Patent No.: US 9,738,374 B2
(45) Date of Patent: Aug. 22, 2017

(54) FLIGHT CONTROL DEVICE FOR AN AIRCRAFT

(71) Applicant: SAFRAN ELECTRONICS & DEFENSE, Boulogne Billancourt (FR)

(72) Inventors: Bruno Tilly, Boulogne Billancourt (FR); Nicolas Ravoux, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 15/120,413

(22) PCT Filed: Feb. 4, 2015

(86) PCT No.: PCT/EP2015/052338
§ 371 (c)(1),
(2) Date: Aug. 19, 2016

(87) PCT Pub. No.: WO2015/128162
PCT Pub. Date: Sep. 3, 2015

(65) Prior Publication Data
US 2017/0008614 A1    Jan. 12, 2017

Related U.S. Application Data

(60) Provisional application No. 61/946,015, filed on Feb. 28, 2014.

(51) Int. Cl.
*B64C 13/50* (2006.01)
*B64C 13/38* (2006.01)
*B64C 13/46* (2006.01)
*B64C 13/04* (2006.01)
*B64C 29/00* (2006.01)

(52) U.S. Cl.
CPC .............. *B64C 13/50* (2013.01); *B64C 13/04* (2013.01); *B64C 13/38* (2013.01); *B64C 13/46* (2013.01); *B64C 29/00* (2013.01)

(58) Field of Classification Search
CPC ......... B64C 13/04; B64C 13/24; B64C 13/38; B64C 13/50; B64C 13/46
See application file for complete search history.

(56) References Cited

U.S. PATENT DOCUMENTS

| 3,747,876 A | 7/1973 | Fortna et al. |
| 4,345,195 A | 8/1982 | Griffith et al. |

FOREIGN PATENT DOCUMENTS

| EP | 1918196 A1 | 9/1980 |
| GB | 1574618 A | 9/1980 |
| GB | 2063786 A | 6/1981 |

*Primary Examiner* — Nicholas McFall
(74) *Attorney, Agent, or Firm* — Muncy, Geissler, Olds & Lowe, P.C.

(57) ABSTRACT

The invention relates to a flight control device for an aircraft, the device comprising a mount, a lever pivotally mounted on the mount, and mechanical means for generating a return force for the lever, said means including a spring and a first motor member that are arranged so that a first end of the spring is constrained to move in rotation with the lever and a second end of the spring is constrained to move in rotation with an outlet shaft of the first motor member. According to the invention, the flight control device includes an electrical assistance system for assisting said mechanical means for generating a return force.

13 Claims, 4 Drawing Sheets ized manner so as to maintain balance and so as to damp any disturbance, whether external (a gust of wind) or internal (movement of the pilot), that might tend to unbalance the aircraft.

FLIGHT CONTROL DEVICE FOR AN AIRCRAFT

The invention relates to a flight control device for an aircraft. More particularly, but not exclusively, the invention relates to a flight control device for an aircraft that is convertible, i.e. that is capable of taking off and landing vertically.

TECHNOLOGICAL BACKGROUND OF THE INVENTION

A flight control device serves to control the movements of an aircraft on the basis of movements imposed by the pilot on a control stick that is connected to said flight control device. Nevertheless, and in particular with a convertible aircraft, the pilot must not pilot the aircraft in the same way when the aircraft is in a stage of flight proper, and when it is in a stage of landing or taking off, thereby making the task of piloting more complex.

In order to assist the pilot, it is thus known to provide a flight control device comprising a mount, a lever pivotally mounted on the mount to pivot about at least one axis of rotation and designed to be secured to the control stick of the aircraft, and mechanical means for generating a return force on the lever about the axis of rotation, said means comprising a spring and a motor member that are arranged in such a manner that a first end of the spring is constrained to move in rotation with the lever and a second end of the spring is constrained to move in rotation with an outlet shaft of the motor member.

As a result, when the lever is moved by the pilot, the spring is stressed by a movement of its first end relative to its second end, thereby generating a return force on the stick. The return force as generated in this way serves to limit the movements imposed by the pilot on the control stick and thus to limit the movements of the aircraft. By modifying the position of the second end of the spring relative to the first end of the spring with the help of the motor member, it then becomes possible to move the anchor point of the spring and thus to modify the force relationship of the spring, i.e. the relationship that defines the forces exerted by the mechanical means for generating a return force on the lever. Under such circumstances, it is possible to modify the force return that is generated for the benefit of the pilot depending on the stage in which the aircraft is to be found: a stage of flight proper, or a stage of taking off or landing. The pilot is thus guided in piloting the aircraft by the flight control device.

Nevertheless, changing the force relationship of the spring by means of the motor member when the pilot is already imposing a movement on the spring via the lever generates a change to the anchor point of the lever that is not necessarily desirable for the pilot. The anchor point remains the point of equilibrium between the stage of flight and workload on the pilot.

OBJECT OF THE INVENTION

An object of the invention is to provide a flight control device for an aircraft that makes it possible to obviate the above-specified drawbacks, at least in part.

BRIEF SUMMARY OF THE INVENTION

In order to achieve this object, the invention provides a flight control device for an aircraft, the device comprising:
a mount;
a lever pivotally mounted on the mount to pivot about at least one axis of rotation and designed to be secured to a control stick of the aircraft; and
mechanical means for generating a return force for the lever about the axis of rotation, said return means comprising a spring and a first motor member that are arranged in such a manner that a first end of the spring is constrained to move in rotation with the lever and a second end of the spring is constrained to move in rotation with an outlet shaft of the first motor member.

According to the invention, the device includes an electrical assistance system for assisting said mechanical means for generating a return force, the system comprising a second motor member that is distinct from the first motor member and that is arranged in such a manner that its outlet shaft is constrained to move in rotation with the first end of the spring, the system including control means for controlling the second motor member in order to modify the stiffness of the spring in operation by means of the second motor member.

Thus, whereas the first motor member enables the anchor point of the spring to be moved, whether or not a force is being exerted on the lever by the pilot, whenever it is intended to modify the force relationship of said spring, i.e. the relationship defining the forces exerted by the mechanical means for generating a return force on the spring, it is the second motor member that enables said force relationship to be modified continuously and without changing the anchor point of the spring. The electrical assistance system thus enables the stiffness of the spring to be modulated more accurately (where this modulation applies to apparent stiffness, since the true stiffness of the spring is an intrinsic value of the spring that is not modified) by opposing or assisting relative movement between the first end of the spring and the second end of the spring as caused by the pilot acting on the stick. The electrical assistance system thus serves to modify the value of the stiffness of the spring continuously even when the pilot is already exerting torque on the lever, but without changing the anchor point of the spring.

In addition, the electrical assistance system makes it possible to perform a damping function for the spring since it accompanies the relative rotation between the two ends of the spring. As a result, the spring does not return suddenly to its equilibrium position as defined by the anchor point.

Because of said electrical assistance system, it then becomes possible to modify much more easily the force return generated by the device of the invention.

Furthermore, the operating limits for the various members that are connected together or driven by the flight control device can vary during a flight as a function of the stage in which the aircraft is to be found (flight proper; take-off or landing). Advantageously, the device of the invention makes it very simple, in service, to modify the force return in order to take account of changes in the operating limits and to limit accordingly the actions of the pilot by increasing the stiffness of the spring by means of the electrical assistance system.

Thus, the resistance imposed on the lever is increased when the pilot moves the lever by means of the stick, thereby warning the pilot of an approaching operating limit for the members that are driven by or connected to said flight control device. The pilot can then move the control stick, and thus the lever, in the other direction in order to feel a reduction in the resistance. Nevertheless, the lever is not blocked, so in an emergency the pilot can still force the lever against the resistance imposed on the lever in order to continue to move the lever.

The control device thus makes it possible to provide the pilot with effective assistance in the pitching task, and to do so in a manner that is intuitive by acting via the return force.

BRIEF DESCRIPTION OF THE DRAWINGS

The invention can be better understood in the light of the following description of a particular, non-limiting embodiment of the invention. Reference is made to the accompanying figures, in which.

DETAILED DESCRIPTION OF THE INVENTION

Figure 1:
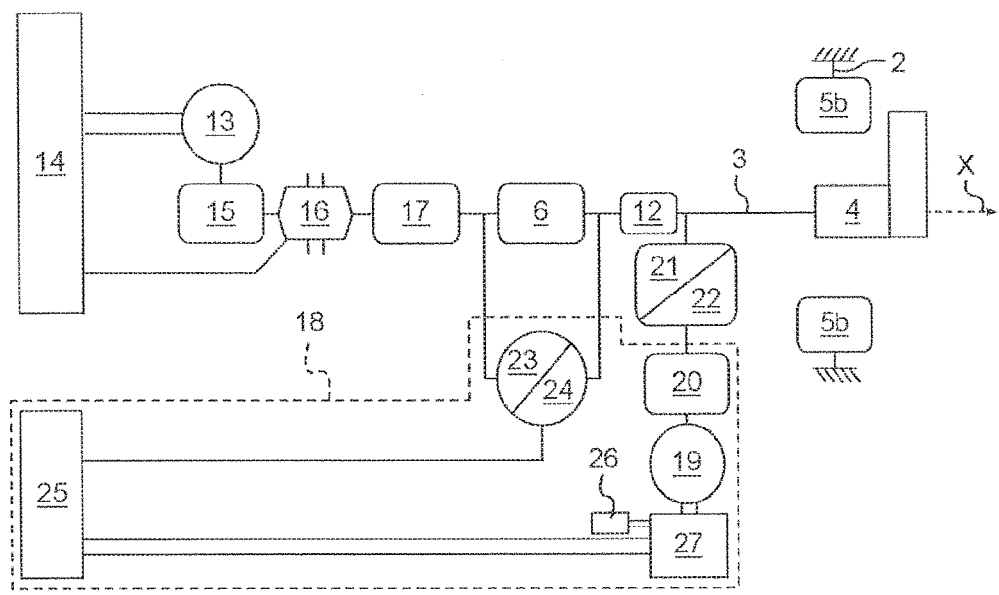
FIG. 1 is a block diagram showing the flight control device of the invention.
Figure 2:
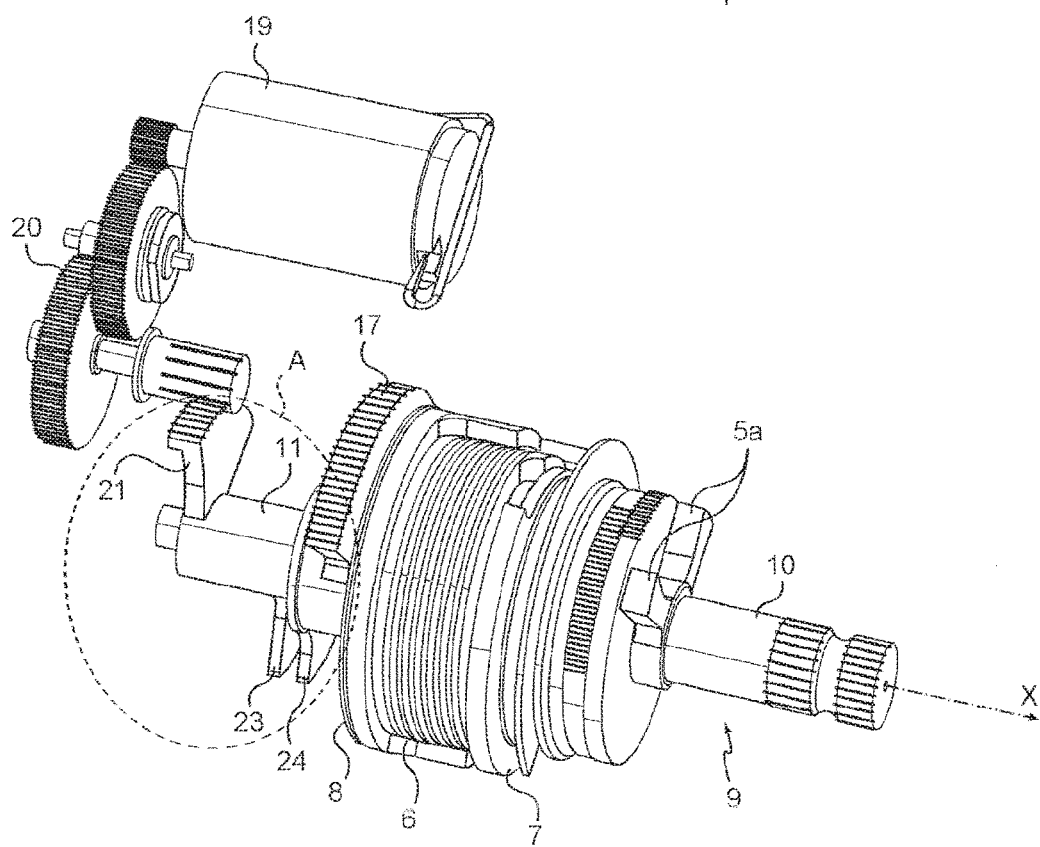
FIG. 2 is a perspective view of a portion of the flight control device shown in FIG. 1.
Figure 3:
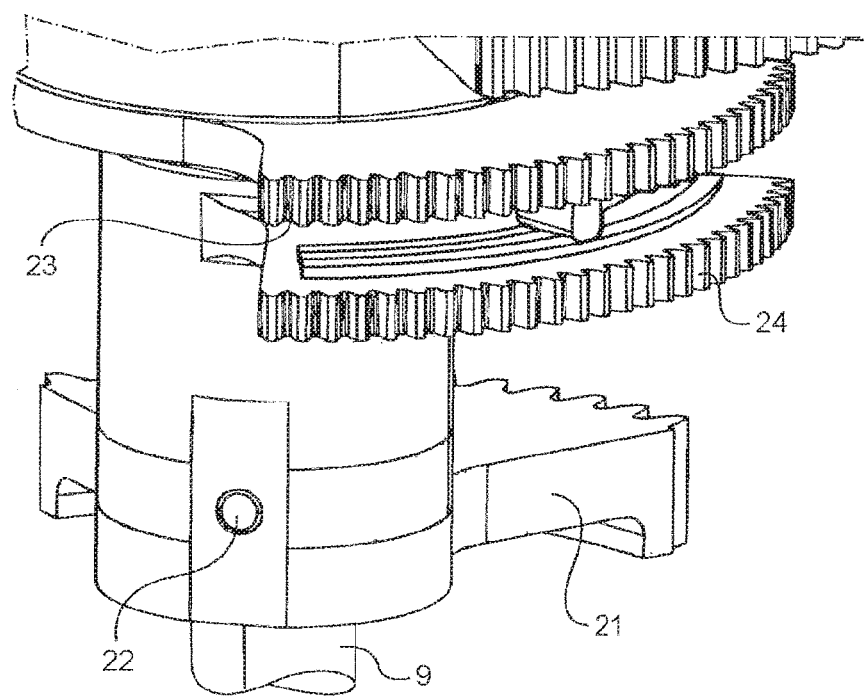
FIG. 3 is an enlarged view of a portion of FIG. 2.

With reference to FIGS. 1 to 3, the flight control device of the invention, given overall reference 1, is installed on board a convertible aircraft in this example.

The flight control device 1 comprises a mount 2 and a lever 3 pivotally mounted on the mount to pivot about an axis of rotation X. In this example, the lever 3 is connected to a control stick 4 of the aircraft for governing pitching movement of the aircraft.

In known manner, the flight control device 1 has mechanical means for limiting an angular stroke of the lever about said axis of rotation X. To this end, the lever 3 has two abutments 5a co-operating with two corresponding abutments 5b of the mount 2 in order to limit the annular stroke of the lever in first and second directions of rotation about the axis of rotation X.

The flight control device 1 also has mechanical means for generating a return force for returning the lever 3 about the axis of rotation X. Said means comprise a spring 6 including a first drive element 7 fastened to a first end of the spring 6 and a second drive element 8 fastened to a second end of the spring 6. The spring 6 is a torsion spring. In general, the spring 6 is defined by a force relationship (twisting torque as a function of deformation angle of the spring) that is characterized by one affine function when the spring 6 can be twisted in one direction of rotation only, given the position of the anchor point for the spring 6, and that is defined by two affine functions under other circumstances when the spring 6 can be twisted in either direction of rotation, each affine function then being associated with a respective one of the twisting directions of the spring. The affine relationship(s) is/are characterized by:

an ordinate value at the origin, namely the value of the torque $C_{min}$ that a pilot must exert on the lever 3 in order to twist the spring 6, i.e. in order to achieve relative movement between the two ends of the spring 6; and a controlling coefficient, i.e. the stiffness of the spring 6 multiplied by a factor of 1 or −1 depending on the twisting direction of the spring 6.

The value of the torque $C_{min}$ that a pilot needs to exert on the lever 3 in order to twist the spring 6, and also the stiffness of the spring 6 are characteristics that are intrinsic to the spring 6 and independent of the anchor position of the spring 6. In a particular embodiment, the spring 6 is configured to present a torque value $C_{min}$ that a pilot needs to exert on the lever in order to twist the spring that is approximately 0.60 newton-meters (N.m) (i.e. 5.32 inch-pounds (in.lbs)). In this example the spring 6 is also configured to present stiffness of 0.068 N.m per degree (i.e. 0.60 in.lbs/deg).

The drive element 7 of the spring 6 in this example is arranged in such a manner as to be constrained to move in rotation with the lever 3 about the axis of rotation X.

In particular manner, the lever 3 has a rod 9 that extends along the axis of rotation X through the inside of the spring 6, the first end 10 of the rod 9 extending outside the spring 6 through the drive element 7 and the second end 11 of the rod 9 extending outside the spring 6 through the drive element 8. The spring 6 is thus constrained to rotate with the drive element 7 at a zone of the rod 9 situated level with that drive element 7. In contrast, the drive element 8 and the rod 9 are not connected together. The rod 9 is also arranged in such a manner that the first end of the rod 9 is constrained to move in rotation with the stick 4 about the axis of rotation X.

The spring 6 is preferably fastened to the rod 9 via a first shear pin 12. As a result, in the event of one of the elements of the mechanical means for generating a return force jamming, or in an emergency, the pilot can exert sufficient torque on the lever 3 to break the first shear pin 12 and thus separate the lever 3 from the mechanical means for generating a return force.

The mechanical means for generating a return force include a first motor member 13.

Furthermore, the flight control device 1 includes first control means 14 for controlling the first motor member 13 by controlling the power supply to the first motor member 13. By way of example, the first control means 14 comprise an electronic control unit (ECU) module. The first control means 14 also receive orders from the flight control computer (FCC) for managing the first motor member 13.

Specifically, the mechanical means for generating a return force include a motion transmission assembly 15, that in this example comprises a movement transformation system, such as, but not exclusively, a wormscrew-and-nut assembly and an irreversible stepdown system.

Preferably, said means also include temporary coupling means 16.

The wormscrew is constrained to rotate with an outlet shaft of the first motor member 13 and thus forms the inlet element of the movement transmission assembly 15. The outlet shaft of the stepdown system forms the outlet element of said movement transmission assembly 15. The temporary coupling means 16 in this example are arranged between said outlet element and a toothed segment 17 fastened to the second drive element 8 of the spring 6.

As a result, the outlet shaft of the first motor member 13 is constrained to move in rotation with said second drive element 8 via the movement transmission assembly 15, the temporary coupling means 16, and the toothed segment 17: rotation of the outlet shaft of the first motor member 13 thus drives rotation of the second end of the spring 6 relative to the first end of the spring 6.

Under such circumstances, and independently of the movement imposed by the pilot on the lever 3, it is possible to modify the position of the second end of the spring 6 relative to the first end of the spring 6 by moving the second drive element 8 with the help of the first motor member 13. This movement of the second drive element 8 thus makes it possible to modify the position of the anchor point of the spring 6, and thus to modify the force relationship of the spring 6.

Figure 4A:
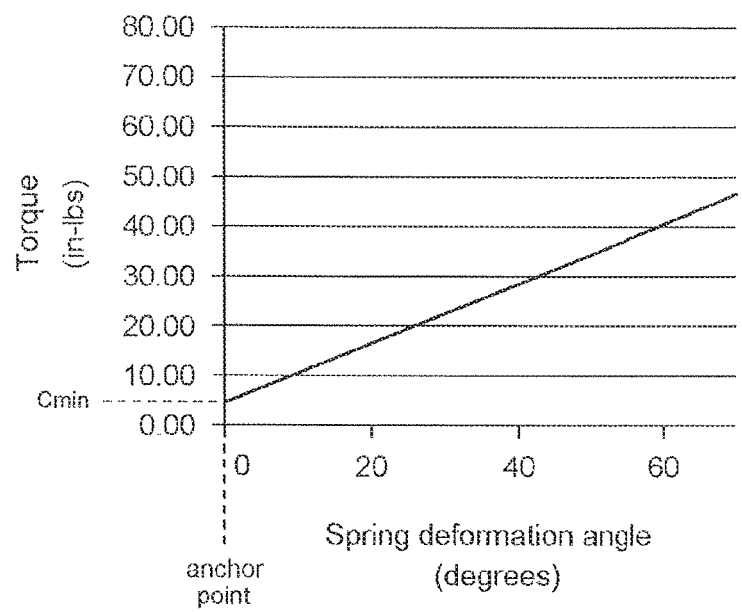
FIGS. 4a and 4b show the spring force relationship for the flight control device shown in FIG. 1 respectively for a first configuration of said device and for a second configuration of said device.
Figure 4B:
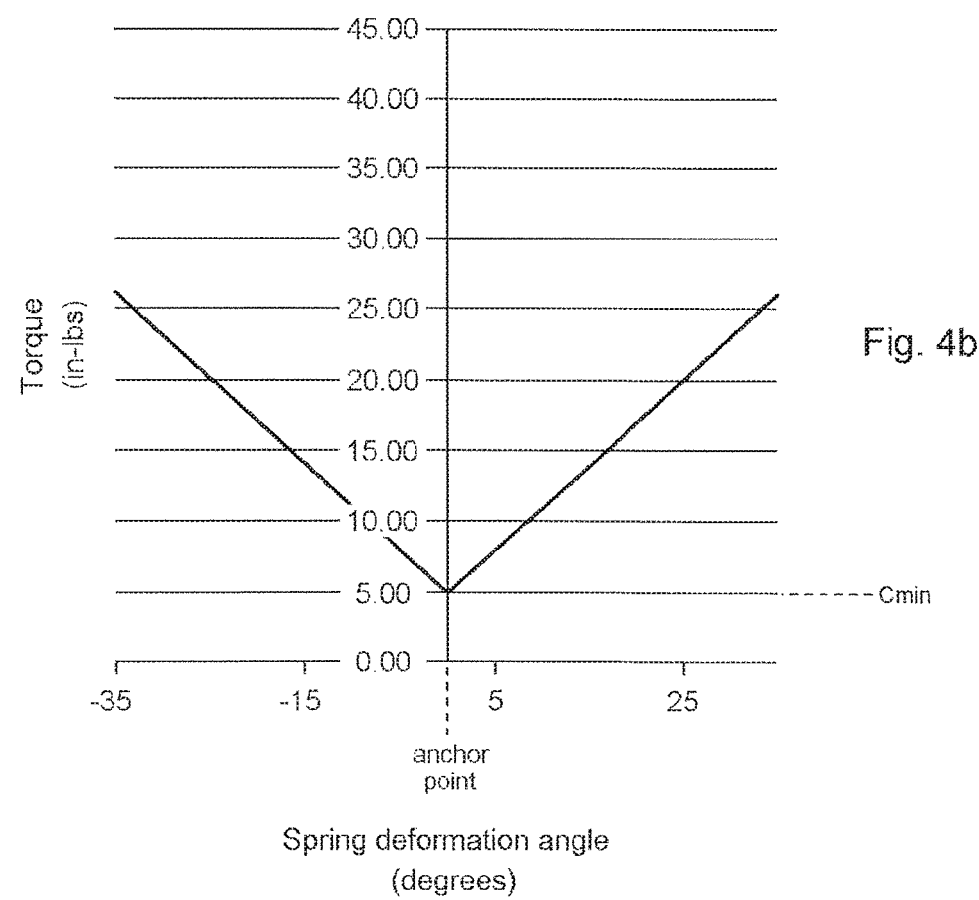

With reference to FIG. 4*a*, the first motor member 13 can thus constrain the spring 6 in such a manner that its anchor point prevents the spring 6 being twisted in one direction of rotation. With reference to FIG. 4*b*, the first motor member 13 can also constrain the spring 6 in such a manner that its anchor point is centered, i.e. such that it is possible to twist the spring 6 through an angle of deformation of the same magnitude in each direction of twisting. It can be seen that for the two positions of the anchor points, the torque value $C_{min}$ that the pilot needs to exert on the lever 3 in order to cause the spring 6 to be twisted and the stiffness of the spring 6 remain identical. The first motor member 13 thus does not provide means for acting on these two parameters.

The flight control device preferably includes mechanical abutments (not shown) limiting the relative movement between the two ends of the spring in order to prevent the first motor member 13 damaging the spring 6 by moving the anchor point beyond the structural limits of the spring 6.

Furthermore, when the first motor member 13 is not powered, if the pilot exerts torque on the lever 3 that is greater than the torque $C_{min}$, then the pilot causes the first end of the spring 6 to move relative to its second end, thereby stressing the spring 6 and thus generating a return force on the lever 3. This makes it possible to simulate force return.

Furthermore, when the temporary coupling means 16 are deactivated, the spring 6 is no longer coupled to the first motor member 13 and thus returns to its non-deformed rest state since there is no longer any stress applied to its anchor point by the first motor member 13. Force return can therefore no longer be generated by the mechanical means for generating a return force.

In the invention, the flight control device 1 includes an electrical assistance system 18 for assisting said mechanical means for generating a return force.

The electrical assistance system 18 includes a second motor member 19 that is distinct from the first motor member 13. By way of example, the second motor member 19 is a direct current (DC) motor with brushes.

In this example, the electrical assistance system 18 includes a stepdown assembly 20 that is arranged between an outlet shaft of the second motor member 19 and a toothed segment 21 fastened to the second end 11 of the rod 9 of the lever 3, which lever 3 is itself constrained to move in rotation with the first drive element 7 by the zone of the rod 9 situated level with the first drive element 7.

Thus, the outlet shaft of the second motor member 19 is constrained to move in rotation with the first drive element 7 via the stepdown assembly 20, the toothed segment 21, and the lever 3: rotation of the outlet shaft of the second motor member 19 thus drives rotation of the first end of the spring 6 relative to the second end of the spring 6.

In a particular embodiment, the toothed segment 21 is fastened to the rod 9 via a second shear pin 22. As a result, in the event of one of the elements of the electrical assistance system 18 jamming, or in an emergency, the pilot can exert sufficient torque on the lever 3 to break the second shear pin 22 and thus separate the electrical assistance system 18 from the lever 3 and the mechanical means for generating a return force. The second shear pin 22 is preferably configured to present a breaking threshold that is less than that of the first shear pin 12. As a result, in the event of a problem in the electrical assistance system, or in an emergency, the pilot can exert sufficient torque on the lever 3 to break the second shear pin 22 without damaging the first shear pin 12. This leads to a degraded mode that is purely mechanical and in which the lever 3 is connected only to the mechanical means for generating a return force, the spring 6 then being capable of being deformed solely by the lever 3 or by the first motor member 13.

Figure 5A:
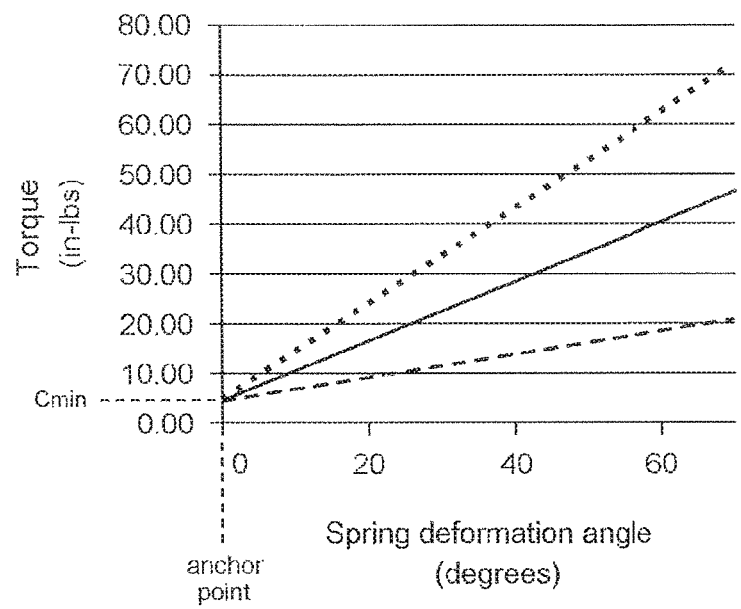
FIGS. 5a and 5b are diagrams identical to those of FIGS. 4a and 4b, but further incorporating two modified spring force relationships during an action of the electrical assistance system on the spring.
Figure 5B:
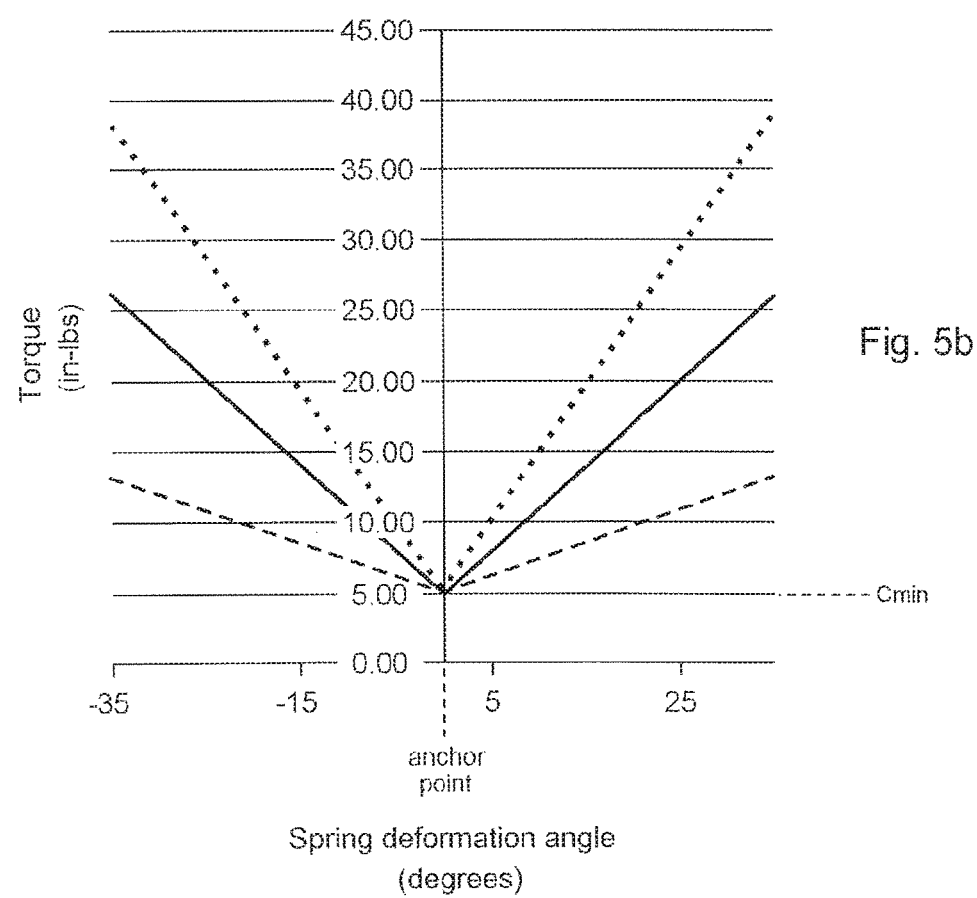

In nominal mode, the spring 6 is connected at its first end to the lever 3 and to the second motor member 19, and at its second end to the first motor member 13. As mentioned above, the second end of the spring 6 can be moved relative to the first end of the spring 6 by the first motor member 13 in order to modify the anchor point of the spring 6, even while force is being exerted on the lever 3 by the pilot or by the second motor member 19. In addition, the first end of the spring 6 can be moved relative to the second end of the spring 6 via the lever simultaneously by the pilot and by the second motor member 19, which can thus oppose or assist the movement imposed on the lever 3 by the pilot. The electrical assistance system 18 thus serves to modify the apparent stiffness of the spring 6 in order to increase the return force exerted on the lever 3 or on the contrary in order to reduce the return force exerted on the lever 3 by the spring 6. As can be seen more clearly in FIGS. 5*a* and 5*b*, the electrical assistance system 18 thus makes it possible to modify the apparent force relationship of the spring 6 by changing the (absolute) value of the slope of the affine functions characterizing said force relationship, either by generating a driving torque on the lever 3 or by generating a resisting torque on the lever 3 (see the curves plotted with dashed lines and with dotted lines).

For this purpose, the flight control device 1 has a first angular movement sensor 23 arranged in association with the spring 6 in order to estimate the relative position between the first end and the second end of the spring 6. By way of example, the first sensor 23 comprises a potentiometer.

Preferably, and in order to provide redundancy, the flight control device 1 also has a second angular movement sensor 24 arranged in association with the spring 6 in order to estimate the relative position between the first end of the spring 6 and the second end of the spring 6. By way of example, the second sensor 24 may be a sensor of the rotary variable differential transformer (RVDT) type.

The flight control device 1 also has second control means 25 for controlling the second motor member 19 by controlling the power supply to the second motor member 19 and thus controlling the movement of the second end of the spring 6 relative to the first end of the spring 6 in order to modulate the force generated by the spring 6 on the lever 3. By way of example, the second control means 25 for the second motor member 19 comprise an electronic control module, a communication interface with the flight control computer in order to specifically to receive setpoints from said computer, and communication interfaces with the first sensor 23 and with the second sensor 24. In this example, the second control means 25 for the second motor member 19 are distinct from the first control means 14 for the first motor member 13. Advantageously, in the event of the second control means being lost, it is still possible to return to a degraded mode that is purely mechanical and in which the force return is generated only by the mechanical means for generating a return force.

The second control means 25 thus power the second motor member 19 as a function in particular of data delivered by the first sensor 23 and the second sensor 24 (making it possible to estimate the force exerted on the spring 6, the position of the anchor point of the spring 6, and whether the pilot is or is not acting on the stick), and setpoints transmitted by the flight control computer in order to soften or harden the force relationship defined by the spring.

Preferably, the second control means 25 power the second motor member 19 to soften or harden the force relationship defined by the spring 6 depending on the stage of flight occupied by the convertible aircraft (climbing, descending, flight proper).

In a particular embodiment, the electrical assistance system 18 includes a resistor 26 and connection means 27 for connecting the second motor member 19 either to the resistor 26 or to the second control means 25. When it is connected to the resistor 26, the second motor member 19 acts as a generator during movement of the first end of the spring 6 relative to the second end of the spring 6, with the electrical energy produced by the second motor member 19 then being dissipated by the Joule effect in the resistor 26. This serves to damp the movement of the lever 3 and thus avoid any sudden return of the spring to the anchor position.

One way of using the device is described below.

In nominal mode, the flight control computer generates a command setpoint for the second control means 25.

When:
the absolute value of the setpoint remains below a first threshold (e.g. 1 volt (V) DC); or
the information delivered by the first sensor 23 and the second sensor 24 to the second control means 25 indicates that the absolute value of the relative deformation between the first end of the spring 6 and the second end of the spring 6 is less than a second threshold, since a torque has been exerted by the pilot on the spring 6 (the second threshold being taken for example to be 0.5 degrees);
then the connection means 27 connect the second motor member 19 to the resistor 26 to provide passive damping.

When:
the absolute value of the setpoint generated by the flight control computer lies between the first threshold and a third threshold (e.g. taken to be 10 V DC); or
the information delivered be the first sensor 23 and the second sensor 24 to the second control means 25 indicates that the absolute value of the relative deformation between the first end of the spring 6 and the second end of the spring 6 is greater than the second threshold, since a torque has been exerted by the pilot on the spring 6;
then the connection means 27 connect the second motor member 19 to the second control means 25 so as to power the second motor member 19 in such a manner as to modify the apparent stiffness of the spring 6, which stiffness is then defined as follows:

$$k'=k+\alpha * V_{setpoint}$$

where:
k' is the value of the apparent stiffness of the spring 6;
k is the value of the intrinsic stiffness of the spring 6 (in this example 0.068 N.m per degree);
α is a predefined correction coefficient (e.g. 0.37 N.m per degree in this example); and
$V_{setpoint}$ is the real (as opposed to absolute) value of the setpoint generated by the flight control computer.

Naturally, the invention is not limited to the embodiment described and various embodiments may be provided without going beyond the ambit of the invention as defined by the claims.

In particular, although the present description relates to a flight control device associated with pitching control or with a convertible aircraft, this application is not limiting and the flight control device of the invention may be used for any other application, e.g. such as governing pitching, roll, yaw, or collective pitch, in a helicopter or in an airplane or in any other aircraft.

Although the first control means and the second control means in this example are distinct, it is possible to envisage controlling the first motor member and the second motor member with single control means. Although the second control means in this example have a single ECU, the second control means could have one ECU for each of the poles of the second motor member.

The connections between the motor members and the spring could be different from those described. For example, the electrical assistance system could also include a friction torque limiter arranged between the second motor member and the first drive element.

The sensors could be different from those described. For example, one or both of the sensors could comprise a potentiometer.

The connections between the motor members and the spring could optionally include a mechanical coupling element serving either to protect the lever from jamming in rotation about the axis X by separating one or all of the subfunctions (subfunction of mechanically generating a return force and subfunction of providing electrical assistance), or else to enable the anchor point to be moved quickly by voluntary action of the pilot on an appropriate control via one or other of the control means.

Thus, although in this example the motor members are connected to the spring via respective shear pins, one or other of the two motor members could be connected to the spring via any other disconnectable device, and in general via any kind of coupling element (such as clutch means). In a variant, one or the other of the two motor members could be connected directly to the spring without a coupling element or more precisely without any disconnectable device. For example, the mechanical means for generating a return force need not include temporary coupling means as a coupling element. The means for generating a return force need not include a shear pin. The electrical assistance system need not include a shear pin.

In general, the connections between the motor members and the spring could be different from the connections described. Thus, the means for generating a return force need not include an irreversible stepdown system.

Although in this example the spring is configured to present a torque value $C_{min}$ of 0.60 N.m that the pilot must exert on the lever in order to twist the spring, this value could be different, for example it could be 1 N.m. Likewise, although in this example the spring is configured to present stiffness of 0.068 N.m per degree, this value could be different, for example it could be 0.1 N.m per degree.

The predefined correction coefficient α could also have a value other than that described, for example it could be 0.05 N.m per degree.

The invention claimed is:
1. A flight control device for an aircraft, the device comprising:
a mount;
a lever pivotally mounted on the mount to pivot about at least one axis of rotation and designed to be secured to a control stick of the aircraft; and
mechanical means for generating a return force for the lever about the axis of rotation, said mechanical means comprising a spring and a first motor member that are arranged in such a manner that a first end of the spring is constrained to move in rotation with the lever and a second end of the spring is constrained to move in rotation with an outlet shaft of the first motor member; the device being characterized in that it includes an electrical assistance system for assisting said mechanical means for generating a return force, the system comprising a second motor member that is distinct from the first motor member and that is arranged in such a manner that its outlet shaft is constrained to move in rotation with the first end of the spring, the system including control means for controlling the second motor member in order to modify the apparent stiffness of the spring in operation by means of the second motor member.

2. The flight control device according to claim 1, including first control means for the first motor member and said control means being second control means for the second motor member, which second control means are distinct from the first control means.

3. The flight control device according to claim 2, wherein the second control means include a first electronic control module and a second electronic control module, each module controlling a respective pole of the second motor member.

4. The flight control device according to claim 1, wherein the second motor member is a direct current motor having brushes.

5. The flight control device according to claim 1, wherein the electrical assistance system includes a stepdown assembly arranged between an outlet shaft of the second motor member and a toothed segment fastened to the lever in such a manner that the outlet shaft of the second motor member is constrained to move in rotation with the first end of the spring via the stepdown assembly, the toothed segment, and the lever.

6. The flight control device according to claim 5, wherein the stepdown assembly further includes a friction torque limiter.

7. The flight control device according to claim 5, wherein the toothed segment is fastened to the lever via a disconnectable device.

8. The flight control device according to claim 1, wherein the electrical assistance system is constrained to move in rotation with the first end of the spring by a disconnectable device.

9. The flight control device according to claim 8, wherein the second end of the spring moves in rotation with the outlet shaft of the first motor member via another disconnectable device.

10. The device according to claim 9, wherein the another disconnectable device presents a breaking threshold that is bigger than that of the disconnectable device connecting the electrical assistance system to the spring.

11. The device according to claim 8, wherein the disconnectable device is a shear pin.

12. The device according to claim 9, wherein the disconnectable device is a shear pin.

13. The device according to claim 10, wherein the disconnectable device is a shear pin.

* * * * *